(12) United States Patent
Shao et al.

(10) Patent No.: US 11,574,613 B2
(45) Date of Patent: Feb. 7, 2023

(54) IMAGE DISPLAY METHOD, IMAGE PROCESSING METHOD AND RELEVANT DEVICES

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiyang Shao, Beijing (CN); Yuxin Bi, Beijing (CN); Ziqiang Guo, Beijing (CN); Yadong Ding, Beijing (CN); Jian Sun, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/977,806

(22) PCT Filed: Dec. 18, 2019

(86) PCT No.: PCT/CN2019/126275
§ 371 (c)(1),
(2) Date: Sep. 2, 2020

(87) PCT Pub. No.: WO2020/140758
PCT Pub. Date: Jul. 9, 2020

(65) Prior Publication Data
US 2020/0402481 A1 Dec. 24, 2020

(30) Foreign Application Priority Data
Jan. 2, 2019 (CN) .......................... 201910001231.7

(51) Int. Cl.
*G09G 5/373* (2006.01)

(52) U.S. Cl.
CPC ......... *G09G 5/373* (2013.01); *G09G 2340/04* (2013.01); *G09G 2354/00* (2013.01)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS

2010/0170950 A1* 7/2010 Iwai .................... G06K 7/10722
235/454
2016/0133201 A1* 5/2016 Border .................... G06F 1/163
345/694
(Continued)

FOREIGN PATENT DOCUMENTS

CN 105847785 A 8/2016
CN 106101684 A 11/2016
(Continued)

OTHER PUBLICATIONS

Evening, 2007, Photoshop CS3 for Photographers (Year: 2007).*
(Continued)

*Primary Examiner* — Todd Buttram
(74) *Attorney, Agent, or Firm* — McCoy Russell LLP

(57) ABSTRACT

The present disclosure provides an image display method, an image processing method and related devices. The image display method includes: receiving and storing an original image from a processing terminal, the original image being an image rendered by the processing terminal; acquiring a first image from the original image; displaying the first image between a first time point and a second time point;
(Continued)

acquiring a second image from the original image; and displaying the second image between the second time point and a third time point.

12 Claims, 8 Drawing Sheets

(58) Field of Classification Search
CPC ......... G06F 11/3664; G06F 3/011–015; G06F 3/012; G06F 3/0304; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 2017/0330598 A1* | 11/2017 | Choi | G11B 27/11 |
| 2018/0047332 A1* | 2/2018 | Kuwahara | G06F 3/147 |
| 2018/0182273 A1 | 6/2018 | Hwang et al. | |
| 2018/0204433 A1* | 7/2018 | Takahashi | G08B 13/19613 |
| 2018/0330169 A1* | 11/2018 | van Hoof | G08B 13/19613 |
| 2019/0220955 A1* | 7/2019 | Kudo | G06T 3/602 |
| 2020/0279354 A1* | 9/2020 | Klaiman | G06T 5/001 |
| 2020/0348515 A1* | 11/2020 | Peuhkurinen | G06T 7/74 |
| 2020/0402481 A1 | 12/2020 | Shao et al. | |

FOREIGN PATENT DOCUMENTS

| | | |
|---|---|---|
| CN | 106127843 A | 11/2016 |
| CN | 106454098 A | 2/2017 |
| CN | 106502427 A | 3/2017 |
| CN | 106998409 A | 8/2017 |
| CN | 107317987 A | 11/2017 |
| CN | 108876700 A | 11/2018 |
| CN | 109743626 A | 5/2019 |
| JP | 2018106157 A | 7/2018 |
| KR | 20180038175 A | 4/2018 |
| WO | 2018169749 A1 | 9/2018 |

OTHER PUBLICATIONS

ISA China National Intellectual Property Administration, International Search Report and Written Opinion Issued in Application No. PCT/CN2019/126275, dated Mar. 19, 2020, WIPO, 16 pages. (Submitted with Partial Translation).

State Intellectual Property Office of the People's Republic of China, Office Action and Search Report Issued in Application No. 201910001231.7, dated Mar. 23, 2020, 14 pages. (Submitted with Partial Translation).

State Intellectual Property Office of the People's Republic of China, Office Action and Search Report Issued in Application No. 201910001231.7, dated Jul. 16, 2021, 14 pages (Submitted with Partial Translation).

* cited by examiner

IMAGE DISPLAY METHOD, IMAGE PROCESSING METHOD AND RELEVANT DEVICES

CROSS-REFERENCE TO RELATED APPLICATION

The present application is a U.S. national phase application of International Application No. PCT/CN2019/126275 filed on Dec. 18, 2019, which claims the priority of Chinese Patent Application No. 201910001231.7 filed on Jan. 2, 2019. The entire contents of each of the above-listed applications are hereby incorporated by reference for all purposes.

TECHNICAL FIELD

The present disclosure relates to the field of image processing technology, in particular to an image display method, an image processing method, and relevant devices.

BACKGROUND

Along with the development of the network technology, currently there are many scenarios where image interaction needs to be performed between terminals. In a typical scenario, an image is rendered by a processing terminal, and then the rendered image is transmitted to a display terminal for display. However, in this technology, each image displayed by the display terminal needs to be rendered separately by the processing terminal and then transmitted separately, so the amount of rendering operations and transmission volume are relatively large for the processing terminal.

SUMMARY

In one aspect, an image display method for a display terminal is provided in some embodiments of the present disclosure, including: receiving and storing an original image from a processing terminal, the original image being an image rendered by the processing terminal; acquiring a first image from the original image; displaying the first image between a first time point and a second time point; acquiring a second image from the original image; and displaying the second image between the second time point and a third time point.

In a possible embodiment of the present disclosure, prior to receiving and storing the original image from the processing terminal, the image display method further includes: predicting, at a fourth time point, first posture data about the display terminal between the first time point and the second time point; and transmitting the first posture data to the processing terminal, the first posture data being used by the processing terminal to render the original image.

In a possible embodiment of the present disclosure, the acquiring the first image from the original image includes clipping the original image in accordance with the first posture data to acquire the first image.

In a possible embodiment of the present disclosure, prior to receiving and storing the original image from the processing terminal, the image display method further includes: predicting, at a fourth time point, first posture data about the display terminal between the first time point and the second time point and eyeball position data between the first time point and the second time point; and transmitting the first posture data and the eyeball position data to the processing terminal, the eyeball position data being used by the processing terminal to optimize a part of the original image corresponding to the eyeball position data.

In a possible embodiment of the present disclosure, the acquiring the first image from the original image includes: predicting, at a fifth time point, second posture data about the display terminal between the first time point and the second time point, the fifth time point being a time point after receiving and storing the original image from the processing terminal; and clipping the original image in accordance with the second posture data to acquire the first image.

In a possible embodiment of the present disclosure, the acquiring the second image from the original image includes: predicting, at a sixth time point, third posture data about the display terminal between the second time point and the third time point, the sixth time point being a time point between the first time point and the second time point; and clipping the original image in accordance with the third posture data to acquire the second image.

In a possible embodiment of the present disclosure, the original image includes an Augmented Reality (AR) or Virtual Reality (VR) image.

In another aspect, an image processing method for a processing terminal is further provided in some embodiments of the present disclosure, including: rendering an image to generate an original image, the original image including a first image to be displayed by a display terminal between a first time point and a second time point and a second image to be displayed between the second time point and a third time point; and transmitting the original image to the display terminal.

In a possible embodiment of the present disclosure, prior to rendering the image to generate the original image, the image processing method further includes receiving first posture data from the display terminal, and the rendering the image to generate the original image includes rendering the image in accordance with the first posture data to generate the original image.

In a possible embodiment of the present disclosure, the rendering the image in accordance with the first posture data to generate the original image includes rendering the image in accordance with the first posture data and a predetermined scale to generate the original image, and a size of the original image is greater than a size of the image displayed by the display terminal by the predetermined scale.

In yet another aspect, a display terminal is further provided in some embodiments of the present disclosure, including: a first reception module configured to receive and store an original image from a processing terminal, the original image being an image rendered by the processing terminal; an acquisition module configured to acquire a first image from the original image; and a display module configured to display the first image between a first time point and a second time point. The acquisition module is further configured to acquire a second image from the original image, and the display module is further configured to display the second image between the second time point and a third time point.

In a possible embodiment of the present disclosure, the display terminal further includes: a prediction module configured to predict, at a fourth time point, first posture data about the display terminal between the first time point and the second time point; and a first transmission module configured to transmit the first posture data to the processing terminal, the first posture data being used by the processing terminal to render the original image.

In a possible embodiment of the present disclosure, the prediction module is further configured to predict, at a sixth time point, third posture data about the display terminal between the second time point and the third time point, the sixth time point is a time point between the first time point and the second time point, and the acquisition module is further configured to clip the original image in accordance with the third posture data to acquire the second image.

In still yet another aspect, a processing terminal is further provided in some embodiments of the present disclosure, including: a rendering module configured to render an image to generate an original image, the original image including a first image to be displayed by a display terminal between a first time point and a second time point and a second image to be displayed between the second time point and a third time point; and a second transmission module configured to transmit the original image to the display terminal.

In a possible embodiment of the present disclosure, the processing terminal further includes a second reception module configured to receive first posture data from the display terminal, and the rendering module is further configured to render the image in accordance with the first posture data to generate the original image.

In still yet another aspect, a display terminal is further provided in some embodiments of the present disclosure, including a display device, a first memory and a first processor. The first processor is configured to receive an original image from a processing terminal and store the original image in the first memory, and the original image is an image rendered by the processing terminal. The first processor is further configured to acquire a first image from the original image, the display device is configured to display the first image between a first time point and a second time point, the first processor is further configured to acquire a second image from the original image, and the display device is further configured to display the second image between the second time point and a third time point.

In a possible embodiment of the present disclosure, prior to receiving the original image from the processing terminal, the first processor is further configured to: predict, at a fourth time point, first posture data about the display terminal between the first time point and the second time point; and transmit the first posture data to the processing terminal, the first posture data being used by the processing terminal to render the original image.

In a possible embodiment of the present disclosure, when acquiring the first image from the original image, the first processor is further configured to clip the original image in accordance with the first posture data to acquire the first image.

In a possible embodiment of the present disclosure, prior to receiving the original image from the processing terminal, the first processor is further configured to: predict, at a fourth time point, first posture data about the display terminal between the first time point and the second time point and eyeball position data between the first time point and the second time point; and transmit the first posture data and the eyeball position data to the processing terminal, the eyeball position data being used by the processing terminal to optimize a part of the original image corresponding to the eyeball position data.

In a possible embodiment of the present disclosure, when acquiring the first image from the original image, the first processor is further configured to: predict, at a fifth time point, second posture data about the display terminal between the first time point and the second time point, the fifth time point being a time point after receiving and storing the original image from the processing terminal; and clip the original image in accordance with the second posture data to acquire the first image.

In a possible embodiment of the present disclosure, when acquiring the second image from the original image, the first processor is further configured to: predict, at a sixth time point, third posture data about the display terminal between the second time point and the third time point, the sixth time point being a time point between the first time point and the second time point; and clip the original image in accordance with the third posture data to acquire the second image.

In a possible embodiment of the present disclosure, the original image includes an AR or VR image.

In still yet another aspect, a processing terminal is further provided in some embodiments of the present disclosure, including a second memory, a second processor, and a computer program stored in the second memory and executed by the second processor. The second processor is configured to read the computer program stored in the second memory to: render an image to generate an original image, the original image including a first image to be displayed by a display terminal between a first time point and a second time point and a second image to be displayed between the second time point and a third time point; and transmit the original image to the display terminal.

In a possible embodiment of the present disclosure, prior to rendering the image to generate the original image, the second processor is further configured to receive first posture data from the display terminal. When rendering the image to generate the original image, the second processor is further configured to render the image in accordance with the first posture data to generate the original image.

In a possible embodiment of the present disclosure, when rendering the image in accordance with the first posture data to generate the original image, the second processor is further configured to render the image in accordance with the first posture data and a predetermined scale to generate the original image, and a size of the original image is greater than a size of the image displayed by the display terminal by the predetermined scale.

In still yet another aspect, a computer-readable storage medium is further provided in some embodiments of the present disclosure, storing therein a computer program. The computer program is executed by a first processor to implement the above-mentioned image display method, or the computer program is executed by a second processor to implement the above-mentioned image processing method.

DETAILED DESCRIPTION

In order to make the objects, the technical solutions and the advantages of the present disclosure more apparent, a detailed description will be given below with reference to the drawings and embodiments.

Figure 1:
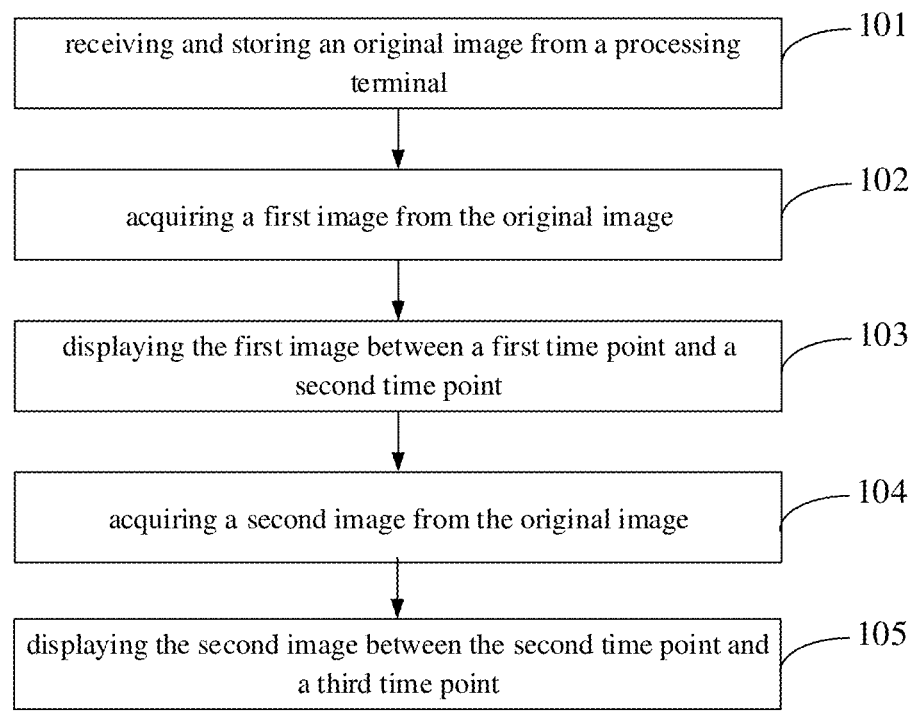
FIG. 1 is a flow chart of an image display method according to some embodiments of the present disclosure.

Referring to FIG. 1, FIG. 1 is a flow chart of an image display method according to some embodiments of the present disclosure. The image display method is applied to a display terminal, including: Step 101 of receiving and storing an original image from a processing terminal, the original image being an image rendered by the processing terminal; Step 102 of acquiring a first image from the original image; Step 103 of displaying the first image between a first time point and a second time point; Step 104 of acquiring a second image from the original image; and Step 105 of displaying the second image between the second time point and a third time point.

The display terminal may be a head-mounted display device, e.g., a Head-Mounted Display (HMD), or any other display terminal whose posture data is variable. The processing terminal may be a main processing device, because in some embodiments of the present disclosure, the rendering of the image may be performed by the processing terminal. To be specific, the processing terminal may be an electronic device connected to the display terminal in a wired or wireless manner, e.g., a Personal Computer (PC), an Access Point (AP), a server, a cloud device or a mobile phone which provides an image to the display terminal in a wired or wireless manner. In a possible embodiment of the present disclosure, the display terminal may further include a network interface (e.g., a network interface 1407 in FIG. 14), and the display terminal may be connected to the processing terminal in a wired or wireless manner via the network interface.

The original image may be an image acquired or generated by the processing terminal. In other words, the image may be a whole, rather than a part of, a certain image, or the original image may be a part of a certain image selected by the processing terminal, e.g., a part of an AR or VR scene image. The AR or VR scene image may be a panoramic AR or VR scene image. It should be appreciated that, in some embodiments of the present disclosure, the original image may not be limited to the AR or VR scene image, or a part of the AR or VR scene image. For example, the original image may be any other scene image or a part of the other scene image, which will not be particularly defined herein. However, in some embodiments of the present disclosure, the description will be given by taking the AR or VR scene image as an example.

In addition, the original image may include the first image and the second image. For example, when the original image may be an original AR or VR scene image, the original image may include the first image and the second image, or a part of an AR or VR scene image including the first image and the second image predicted by the processing terminal or determined from the AR or VR scene image in accordance with posture data provided by the display terminal.

Figure 2:
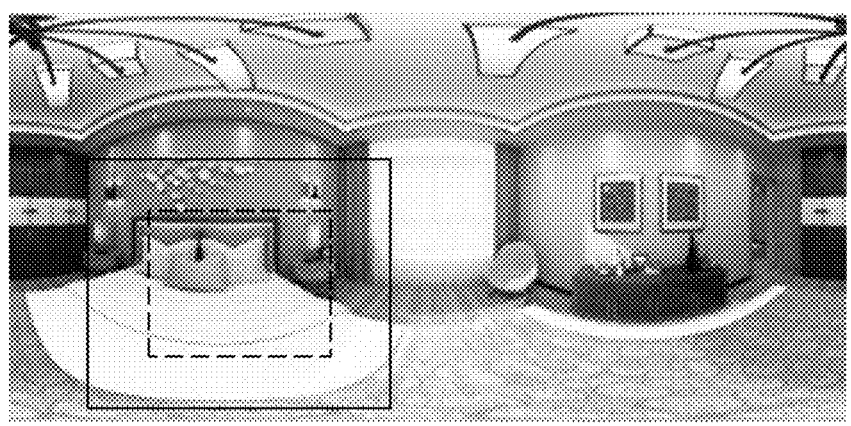
FIG. 2 is a schematic view showing an original image according to some embodiments of the present disclosure.

It should be appreciated that, the first image may be an image displayed by the display terminal within a range of a user's line of sight between the first time point and the second time point, or the first image may be an image visible to a user on the display terminal between the first time point and the second time point, e.g., an AR or VR image in FIG. 2, where the first image is an image in a dotted box in FIG. 2, and an image in a solid box is the original image. In other words, the image visible to the user on the display terminal between the first time point and the second time point may be the image in the dotted box.

Identically, the second image may be an image displayed by the display terminal within the range of the user's line of sight between the second time point and the third time point, or an image visible to the user on the display terminal between the second time point and the third time point.

In addition, the acquiring the first image from the original image may include clipping the original image to acquire an image at a specific position of the original image, and the acquiring the second image from the original image may include clipping the original image to acquire the second image adjacent to or partially overlapping the first image. In a possible embodiment of the present disclosure, the first image and the second image may be clipped from the original image in accordance with predicted posture data.

It should be appreciated that, the first image and the second image may be two images continuously displayed by the display terminal.

Through the above steps, the image (i.e., the original image) may be received from the processing terminal, so as to display two images (i.e., the first image and the second image) continuously, thereby to reduce the amount of rendering operations and transmission volume for the processing terminal. In addition, in some embodiments of the present disclosure, when the method is applied to an AR or VR product, it is able to improve the portability of the AR or VR product, increase a display frame rate, reduce a delay for the AR or VR product, and improve the value, performance and quality of the AR or VR product.

For example, when the first image is an $n^{th}$ image, the second image is an $(n+1)^{th}$ image and a frame rate desired for the display terminal is 120 Hz, the processing terminal merely needs to provide each image at a frame rate of 60 Hz. Of course, in the above method, a third image may also be acquired from the original image by using a method of displaying the second image, and the third image, or even more images, may be displayed. For example, when the first image is the $n^{th}$ image, the second image is the $(n+1)^{th}$ image, the third image is an $(n+2)^{th}$ image and a frame rate desired for the display terminal is 90 Hz, the processing terminal merely needs to provide each image at a frame rate of 30 Hz. The smaller the frame rate of a main data processing device, the more the image contents to be included in the original image, because more images need to be extracted from the original image.

It should be appreciated that, in some embodiments of the present disclosure, an order of Steps 103 and 104 will not be particularly defined herein. For example, as shown in FIG. 1, Step 103 may be performed prior to Step 104, or Steps 103 and 104 may be performed simultaneously, which will not be particularly defined herein.

In a possible embodiment of the present disclosure, prior to receiving and storing the original image from the processing terminal, the image display method may further include: predicting, at a fourth time point, first posture data about the display terminal between the first time point and the second time point; and transmitting the first posture data to the processing terminal, the first posture data being used by the processing terminal to render the original image.

The fourth time point may be any time point prior to receiving and storing the original image from the processing terminal. The first posture data may be predicted posture data about the display terminal at the first time point or the second time point or predicted posture data about the display terminal at any time point between the first time point and the second time point (e.g., an intermediate time point or any other time point therebetween).

The posture data may be predicted through a posture sensor in the display terminal, e.g., an Inertial Measurement Unit (IMU), an optical sensor, a gyroscope or an electronic compass. It should be appreciated that, the posture sensor may provide current posture data about the display terminal, or predict posture data at a next time point or next time points. For example, the posture sensor may output the posture data at a specific frequency, e.g., the gyroscope may output the posture data 1000 times per second. In addition, in some embodiments of the present disclosure, the posture data may be used to indicate a spatial posture of the display terminal, e.g., an attitude angle or spatial posture coordinates.

In addition, upon the receipt of the first posture data, the processing terminal may render the image in accordance with the first posture data to generate the original image. Here, the image may be directly rendered to acquire the original image including the first image and the second image. Of course, an image content of the first image may be determined, an image content whose image size is greater than the image content of the first image by a predetermined scale may be determined, and then an image including the image content may be rendered to acquire the original image including the first image and the second image. For example, the processing terminal may determine coordinates of the first posture data in a coordinate system corresponding to the AR or VR scene image, and determine the first image in accordance with the coordinates. Alternatively, the processing terminal may determine the first image in accordance with a bearing corresponding to the first posture data. For example, when the first posture data indicates that the display terminal directly faces a first bearing, the processing terminal may determine a center image corresponding to the first bearing in the AR or VR scene image as the first image.

In a possible embodiment of the present disclosure, the processing terminal may render the image in accordance with the first posture data and a predetermined scale to generate the original image, and a size of the original image may be greater than a size of the image displayed by the display terminal by the predetermined scale. To be specific, an image content of the original image may be determined in accordance with the first posture data and the predetermined scale, and the image content may include image contents of the first image and the second image. The size of the image displayed by the display terminal may be a size of the image visible to the user. For example, usually about one eighth of the image content of a panoramic image at a horizontal field angle of 360°, a vertical field angle of 180° or in a VR scene, may be viewed by human eyes, i.e., the size of the image displayed by the display terminal may be one eighth of the panoramic image. Of course, the size of the image displayed by the display terminal may also be a size of the first image, and in some embodiments of the present disclosure, the images displayed by the display terminal may be of a same size. For example, the size of each of the first image and the second image may be equal to a size of a display interface. In addition, the predetermined scale may be acquired from experience.

In the embodiments of the present disclosure, the first posture data may be transmitted to the processing terminal, so that the processing terminal may determine the image content of the original image, thereby the processing terminal may merely render and transmit the image content of the original image. As a result, it is able to further reduce the amount of rendering operations and transmission volume for the processing terminal.

It should be appreciated that, in the embodiments of the present disclosure, the first image may be acquired in various modes.

In one mode, the acquiring the first image from the original image may include clipping the original image in accordance with the first posture data to acquire the first image.

The clipping the original image may include clipping the original image to acquire the first image having a specific size and at a specific position corresponding to the first posture data. For example, when the original image may be an image in the AR or VR scene image with the first image as a reference position and with a size greater than a size of the first image by the predetermined scale, and the size of the first image is of a fixed value, the display terminal may extract the first image at the reference position and with the fixed size from the original image in accordance with the first posture data.

The reference position may be a preset position, e.g., a centered position, i.e., the first image may be a centered part of the original image. Of course, the reference position will not be particularly defined herein. For example, the display terminal may transmit the first posture data and third posture data predicted between the second time point and the third point to the processing terminal. The processing terminal may determine the reference position in accordance with the third posture data. For example, when the third posture data indicates that the display terminal moves to the left relative to the first posture data, the reference position may be a position on the right of the original image.

The fixed size may be a preset size of the image capable of being viewed by the user through the display terminal at a same time point (or at a same posture).

Figure 3:
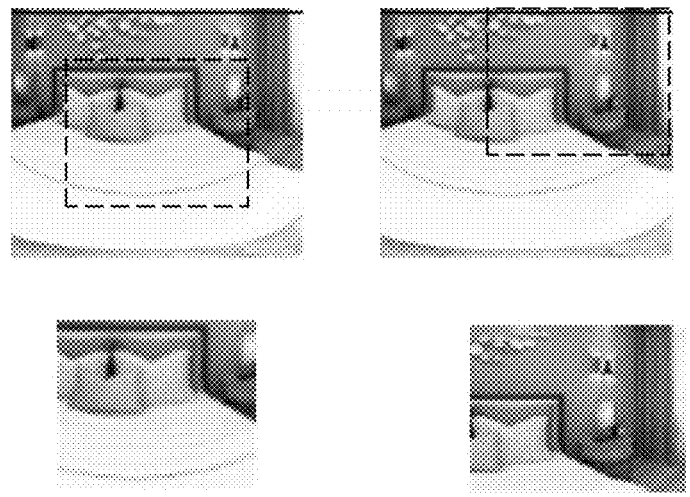
FIG. 3 is a schematic view showing a first image and a second image according to some embodiments of the present disclosure.

For example, taking the image in FIG. 2 as an example, the original image determined by the processing terminal may be an image shown in FIG. 3 at an upper left corner. In other words, in the embodiments of the present disclosure, the processing terminal merely needs to render and transmit the original image. In this way, the display terminal may determine the first image at a lower left corner in FIG. 3, an image in a dotted box in an image at an upper right corner in FIG. 3 may be the second image, and an image at a lower right corner in FIG. 3 may be the second image.

Of course, in some embodiments of the present disclosure, the first image may not be limited to be acquired by clipping the original image in the above-mentioned mode. For example, when the original image is transmitted by the processing terminal, a label indicating a position of the first image in the original image may be added, which will not be particularly defined herein.

In this mode, an image visible to the user on the display terminal in accordance with the first posture data may be determined as the first image. In other words, the first image may be called as the image visible to the user on the display terminal in accordance with the first posture data, i.e., the first image visible to the user on the display terminal in accordance with the first posture data. For example, when the first posture data indicates that the display terminal directly faces a first direction, a first visible image at this posture may be an image at a center region of the AR or VR image in the first direction. In addition, the original image may be clipped in accordance with the first posture data to acquire the first image, so it is able to determine the first image accurately and rapidly.

In another mode, the acquiring the first image from the original image may include: predicting, at a fifth time point, second posture data about the display terminal between the first time point and the second time point, the fifth time point being a time point after receiving and storing the original image from the processing terminal; and clipping the original image in accordance with the second posture data to acquire the first image.

The fifth time point may be any time point before the first time point and after receiving and storing the original image from the processing terminal. The second posture data may be posture data about the display terminal predicted at the first time point and the second time point, or posture data about the display terminal predicted at any time point between the first time point and the second time point (e.g., an intermediate time point or any other time point therebetween).

The second posture data may be predicted through a posture sensor in the display terminal, e.g., an IMU, an optical sensor, a gyroscope or an electronic compass.

The clipping the original image in accordance with the second posture data may include determining the image content of the first image in the original image in accordance with the second posture data, and clipping the original image. For example, an offset amount of the second posture data relative to the first posture data may be calculated, an offset region with the offset amount relative to the image corresponding to the first posture data in the original image, and an image in the offset region may be clipped from the original image as the first image. Of course, the offset amount of the second posture data relative to the first posture data may not be calculated, and instead, a content to be displayed may be determined directly in accordance with the second posture data.

The calculating the offset amount of the second posture data relative to the first posture data may include calculating an offset amount between coordinates corresponding to the second posture data and coordinates corresponding to the first posture data. For example, the second posture data and the first posture data may each be converted into coordinates in an AR or VR spatial coordinate system, or the second posture data and the first posture data may each be spatial coordinates outputted by a spatial posture sensor.

For example, when the first posture data indicates that the display terminal directly faces a first direction and the offset amount of the second posture data relative to the first posture data is a parallel, leftward offset of 5°, the offset region may be a region acquired through translating the image corresponding to the first posture data to the left by 5°.

It should be appreciated that, in some embodiments of the present disclosure, the first image may not be limited to be acquired by clipping the original image in accordance with the offset amount. For example, the first image may be determined in accordance with a predetermined correspondence between the second posture data or a direction corresponding to the second posture data and a position of the first image.

In this mode, upon the receipt of the original image, the second posture data about the display terminal may be predicted again between the first time point and the second point, and then the first image may be acquired by clipping the original image in accordance with the posture data. A time when the second posture data is predicted may be closer to a time when the first image is displayed, so the second posture data may match, in a better manner, the posture of the display terminal at the time when the first image is displayed. As a result, it is able to acquire the first image in accordance with second posture data in a more accurate manner.

In a possible embodiment of the present disclosure, the transmitting the first posture data to the processing terminal may include transmitting the first posture data and eyeball position data to the processing terminal, and the eyeball position data may be used by the processing terminal to optimize a part of the original image corresponding to the eyeball position data.

The first posture data and the eyeball position data may be transmitted to the processing terminal through an identical message, and used to indicate an eyeball position at the first posture data.

Figure 4:
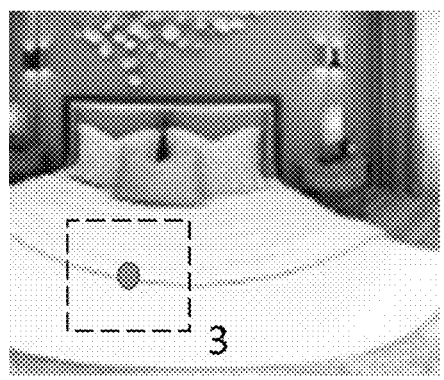
FIG. 4 is a schematic view showing a part of the original image according to some embodiments of the present disclosure.

The eyeball position data may be acquired through tracking an eyeball, e.g., whether the eyeball is on the left, on the right, at the top or at the bottom of an eye. After the eyeball position data has been determined, the processing terminal may determine a part of the original image corresponding to the eyeball position data. For example, when the eyeball is located in the middle of the eye, the processing terminal may determine an image at a central region of the first image as the part of the original image. When the eyeball is located at a left-of-center position of the eye, the processing terminal may determine the part of the original image in the dotted box as shown in FIG. 4.

In addition, the optimizing the part of the original image may include optimizing imaging quality. For example, the image quality of the part of the original image may be optimized through grayscale modification, image smoothing or median filtering.

In the embodiments of the present disclosure, the part of the original image corresponding to the eyeball position data may be optimized so as to improve the image quality.

In a possible embodiment of the present disclosure, the acquiring the second image from the original image may include: predicting, at a sixth time point, third posture data about the display terminal between the second time point and the third time point, the sixth time point being a time point between the first time point and the second time point; and clipping the original image in accordance with the third posture data to acquire the second image.

The third posture data may be posture data predicted at the second time point or the third time point, or posture data predicted at any time point between the second time point and the third time point. For example, when the first posture data is posture data about the display terminal predicted for an $n^{th}$ image, the third posture data may be posture data about the display terminal predicted for an $(n+1)^{th}$ image.

The clipping the original image in accordance with the third posture data may refer to the above-mentioned step of clipping the original image in accordance with the second posture data to acquire the first image, which will not be particularly defined herein.

It should be appreciated that, the third posture data is the predicted posture data, so the second image may be also be called as a predicted image, i.e., an image visible to the user may be predicted in accordance with the predicted posture data. The second image may also be called as a visible image on the display terminal in accordance with the third posture data.

In the embodiments of the present disclosure, the original image may be clipped in accordance with the third posture data to acquire the second image, so that the second image may be acquired in a more accurate manner. Of course, in some embodiments of the present disclosure, the second image may not be limited to be predicted in accordance with the third posture data. For example, the second image continuously displayed with the first image may be predicted by using a pre-trained neural network model.

In addition, in some embodiments of the present disclosure, the method may further include performing anti-distortion treatment on the first image and the second image. For example, when distortion occurs due to the use of a lens and the first image and the second image have been extracted, the display terminal may perform the anti-distortion treatment on the first image and the second image, and then display the first image and the second image, so as to improve an image display effect.

To be specific, a main functional framework of a system in FIG. 5 will be described hereinafter illustratively.

Figure 5:
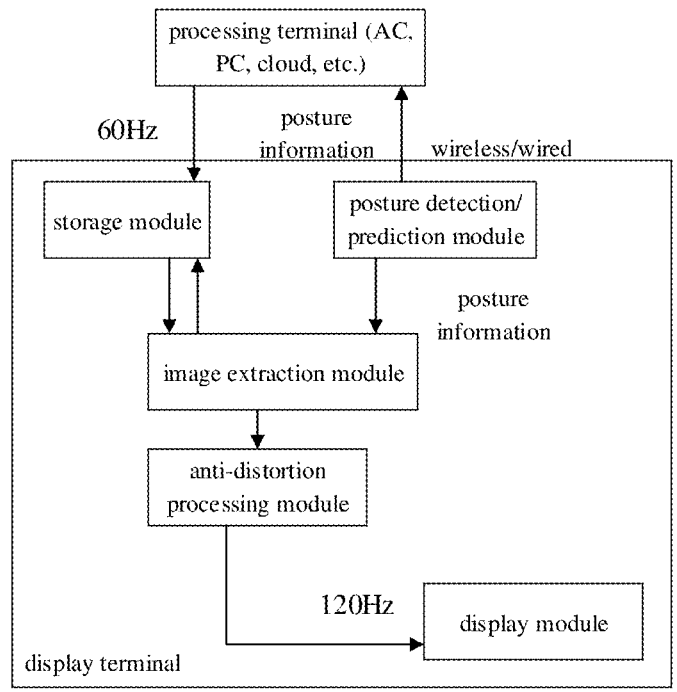
FIG. 5 is a schematic view showing a system framework according to some embodiments of the present disclosure.

As shown in FIG. 5, the processing terminal may transmit each frame to the display terminal at a frame rate of 60 Hz, and the display terminal may display each image at a frame rate of 120 Hz, i.e., a first image and a second image may be clipped from each image transmitted by the processing terminal.

The display terminal may include: a posture detection/prediction module (e.g., a posture sensor) configured to provide current posture information about the display terminal, and posture information at a next time point, i.e., predict a posture of the display terminal; a storage module configured to store therein data contents provided by the data processing terminal; an image extraction module configured to acquire a position of a to-be-displayed image in a stored image in accordance with the posture information, and extract the first image and the second image; and an anti-distortion processing module configured to, when distortion occurs for a displayed portion due to the use of a lens, perform the anti-distortion treatment on the image for the subsequent output.

Figure 6:
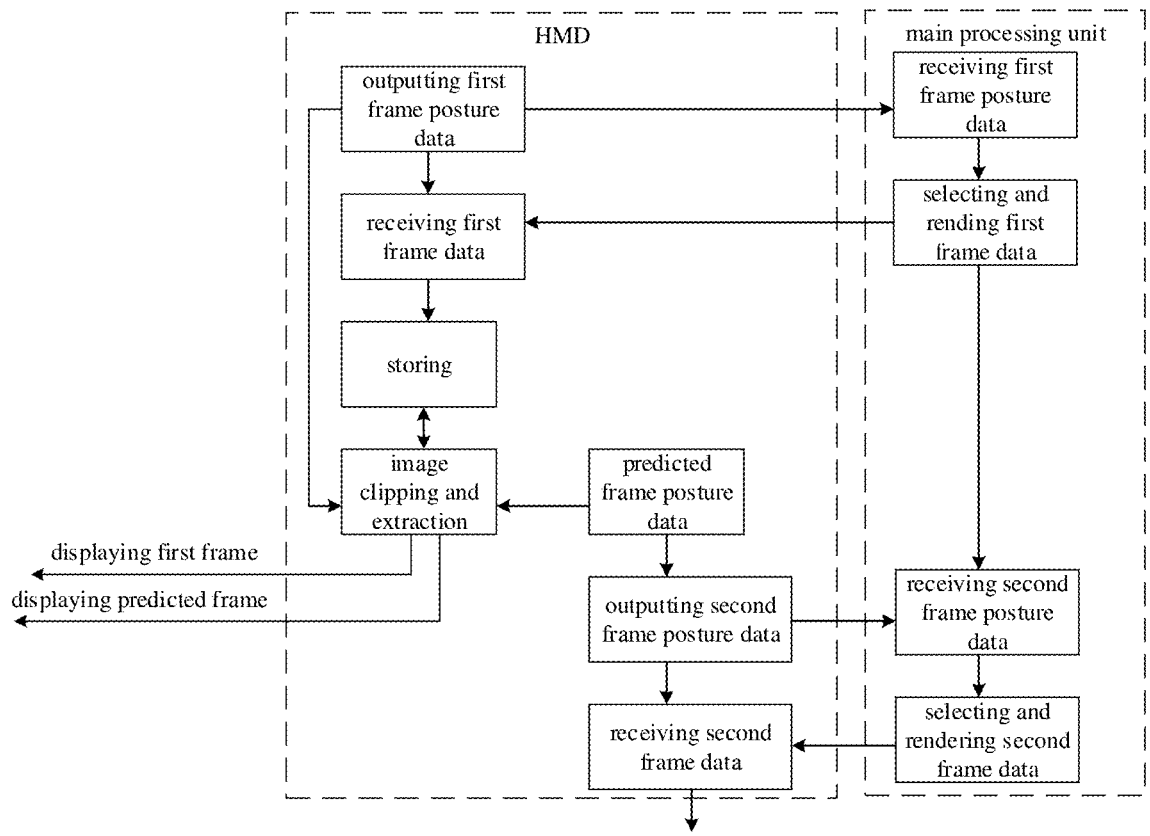
FIG. 6 is a schematic view showing the image display method according to some embodiments of the present disclosure.

In FIG. 6, the description will be given when the display terminal is a head-mounted display device, the processing terminal is a main processing unit, and a first frame, a predicted frame and a second frame are displayed by the display terminal. As shown in FIG. 6, the display terminal may acquire first frame posture data (i.e., the first posture data), e.g., an attitude angle, through the posture detection/prediction module, and transmit it to the processing terminal. Upon the receipt of the first frame posture data, the processing terminal may determine the first image, i.e., an image visible to the user (e.g., an image in the dotted box in FIG. 2), in accordance with the first frame posture data. Next, the processing terminal may select an image having a size greater than the first image, i.e., an image in the solid box in FIG. 2, and process, e.g., render, the selected image. The selection of the image in the solid box may be subjected to a visible range for adjacent predicted postures. First frame data may include the first image and the second image. Next, the display terminal may receive and store the first frame data rendered by the processing terminal, and the posture detection/prediction module of the display terminal may provide predicted frame posture data (i.e., the third posture data) to the image extraction module.

Next, the image extraction module may acquire the first image in accordance with the first frame posture data, and provide it to the display module (or to the anti-distortion processing module and then to the display module). Usually, the first image may be an image at a fixed position (a centered portion of the stored image). The image extraction module may receive the predicted posture information, and determine predicted frame display data (i.e., the second image) at the predicted posture. For example, the image extraction module may provide the second image, which is offset from the position in the stored image and which has a size identical to the visible image at a first frame posture, to the display module (or to the anti-distortion processing module and then to the display module).

Then, the head-mounted display device may provide second frame posture data (i.e., posture data subsequent to the third posture data) to the main processing unit. The treatment on the basis of the second frame posture data may refer to the above steps and thus will not be particularly defined herein.

Figure 7:
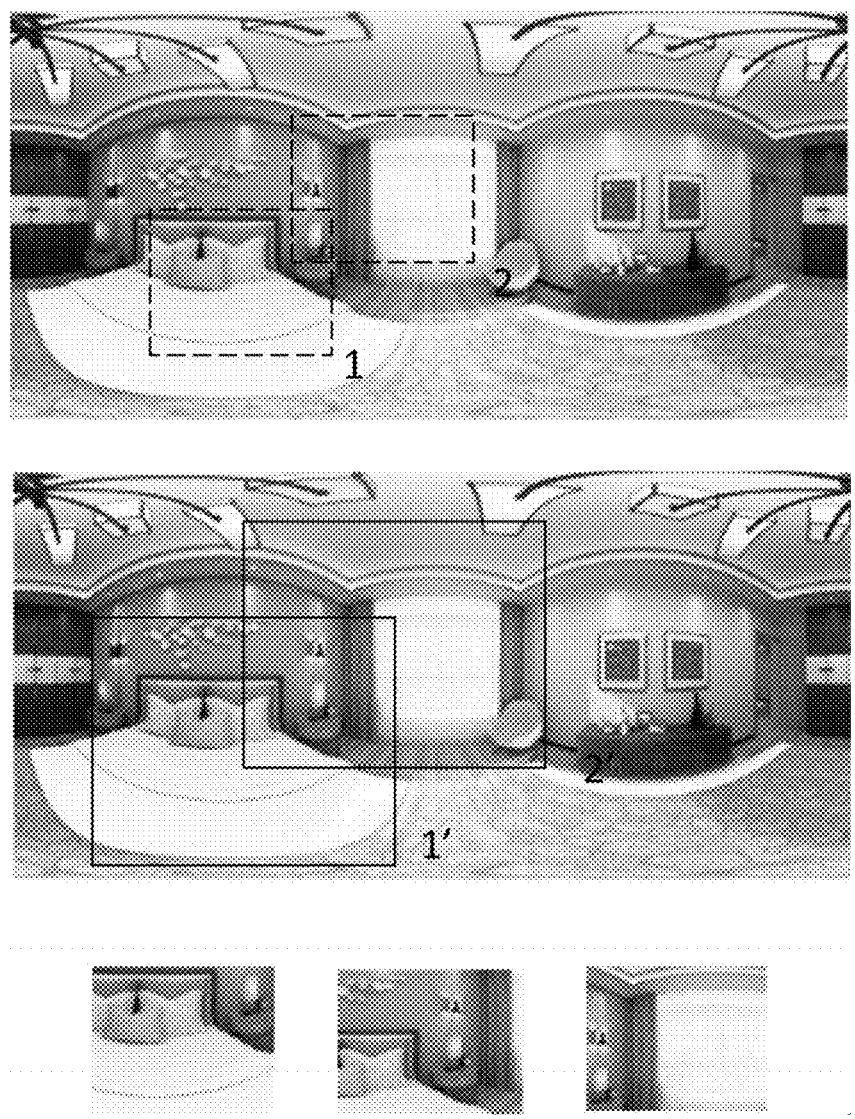
FIG. 7 is another schematic view showing the first image and the second image according to some embodiments of the present disclosure.

As shown in FIG. 7, a top picture shows positions of the visible images corresponding to the first frame posture data and the second frame posture data in the scene, a middle picture shows two images rendered and transmitted by the processing terminal in accordance with the first frame posture data and the second frame posture data, and a bottom picture shows a first frame, a second frame and a third frame displayed by the display terminal. The second frame may be a predicted frame (i.e., the second image, or an interpolated image), and the third frame may be a first image corresponding to the second frame posture data.

Figure 8:
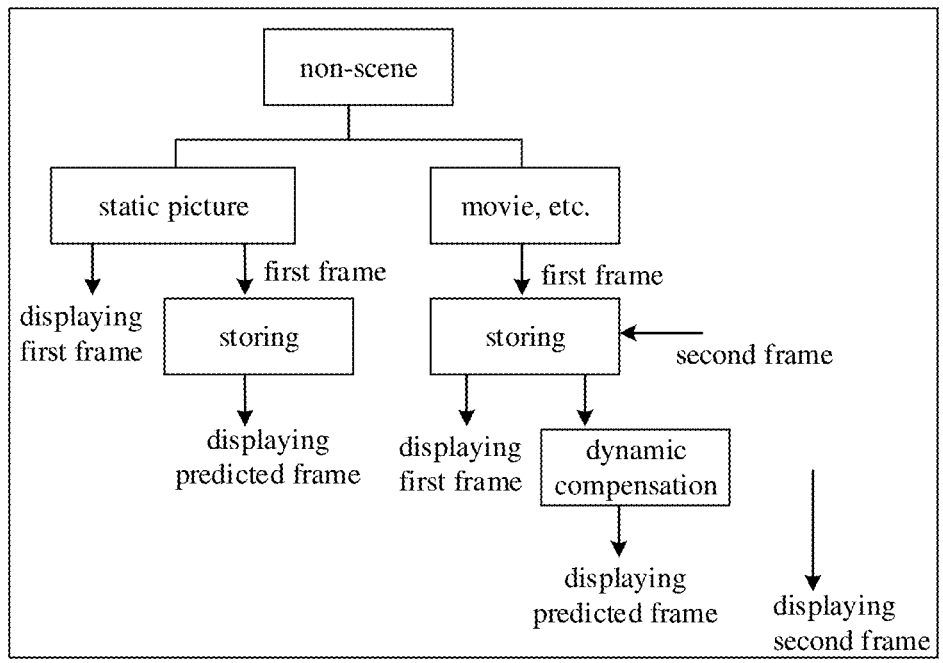
FIG. 8 is another schematic view showing the image display method according to some embodiments of the present disclosure.

It should be appreciated that, the image display method in the embodiments of the present disclosure may be applied to a scene mode, i.e., the AR or VR image may be an AR or VR scene image. In a non-scene mode, i.e., when the AR or VR image is a non-scene image, as shown in FIG. 8, with respect to a data source whose contents are refreshed very slowly, e.g., static pictures or displayed pictures, a content of the predicted frame may be a simple duplication of a content of a previous frame, i.e., the first frame may be stored and displayed as the predicted frame. With respect to contents which need to be refreshed rapidly, e.g., movies, a dynamic compensation module or a module on the basis of a neural network frame interpolation algorithm may be added, so as to acquire and display the predicted frame.

It should be appreciated that, FIG. 8 merely shows an example, and the image display method in the embodiments of the present disclosure shall not be limited to be applied to the scene image. For example, the image display method may also be applied to any other scene where a part of the AR or VR image is visible to the user at a same time point (or at a same posture) through the head-mounted display device.

In addition, it should be appreciated that, whether the image data described hereinabove, e.g., the original image, the first image and the second image, is used as a left-eye image or a right-eye image will not be particularly defined herein. For example, the original image, the first image and the second image may be used as a left-eye image or a right-eye image, or both. In an actual driving procedure, a corresponding driving operation may be performed in accordance with the right-eye or left-eye image, so as to improve a display effect.

According to the embodiments of the present disclosure, the original image from the processing terminal may be received and stored, and the original image may be an image rendered by the processing terminal. The first image may be acquired from the original image, and displayed between the first time point and the second time point. The second image may be acquired from the original image, and displayed between the second time point and the third time point. As a result, it is able for the display terminal to acquire two images from one original image, and display two images in accordance with one received image, thereby to reduce the amount of rendering operations and transmission volume for the processing terminal.

Figure 9:
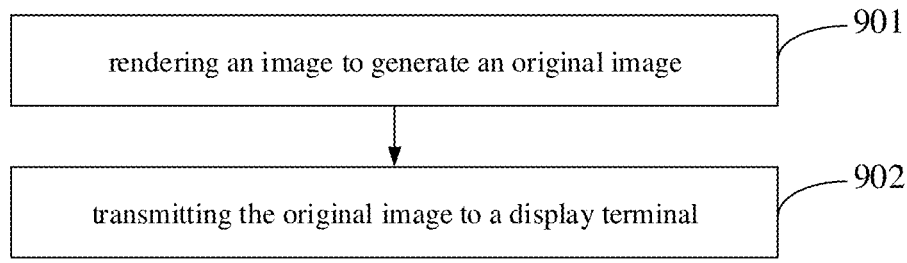
FIG. 9 is a flow chart of an image processing method according to some embodiments of the present disclosure.

Referring to FIG. 9, FIG. 9 is a flow chart of an image processing method according to some embodiments of the present disclosure. The image processing method is applied to a processing terminal, as shown in FIG. 9, which includes: Step 901 of rendering an image to generate an original image, the original image including a first image to be displayed by a display terminal between a first time point and a second time point and a second image to be displayed between the second time point and a third time point; and Step 902 of transmitting the original image to the display terminal.

The description about the first image, the second image and the original image may refer to that in the embodiments as shown in FIG. 1, and thus will not be particularly defined herein.

In a possible embodiment of the present disclosure, prior to rendering the image to generate the original image, the image processing method may further include receiving first posture data from the display terminal, and the rendering the image to generate the original image may include rendering the image in accordance with the first posture data to generate the original image.

Here, the image may be directly rendered to acquire the original image including the first image and the second image. Of course, an image content of the first image may be determined, and an image including the image content may be rendered to acquire the original image including the first image and the second image. For example, the processing terminal may determine coordinates of the first posture data in a coordinate system corresponding to an AR or VR scene image, and determine the first image in accordance with the coordinates. Alternatively, the processing terminal may determine the first image in accordance with a bearing corresponding to the first posture data. For example, when the first posture data indicates that the display terminal directly faces a first bearing, the processing terminal may determine a center image corresponding to the first bearing in the AR or VR scene image as the first image.

In the embodiments of the present disclosure, the processing terminal may merely render and transmit the image content of the original image, so as to further reduce the amount of rendering operations and transmission volume for the processing terminal.

In a possible embodiment of the present disclosure, the rendering the image in accordance with the first posture data to generate the original image may include rendering the image in accordance with the first posture data and a predetermined scale to generate the original image, and a size of the original image may be greater than a size of the image displayed by the display terminal by the predetermined scale.

In the embodiments of the present disclosure, an image content of the original image may be determined in accordance with the first posture data and the predetermined scale, and the image content may include image contents of the first image and the second image. The size of the image displayed by the display terminal may be a size of the first image. In some embodiments of the present disclosure, the images displayed by the display terminal may be of a same size. For example, the size of each of the first image and the second image may be equal to a size of a display interface. In addition, the predetermined scale may be acquired from experience.

It should be appreciated that, the implementation of the image processing method may refer to that of the processing terminal in the method as shown in FIG. 1, with a same beneficial effect, which will not be particularly defined herein.

Figure 10:
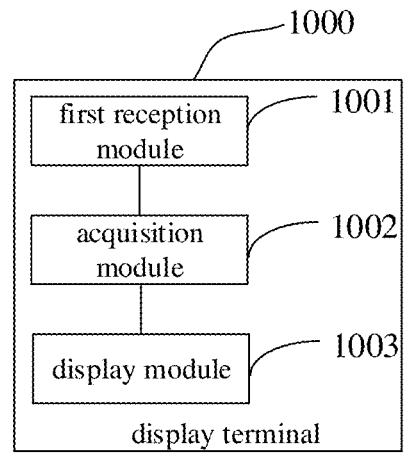
FIG. 10 is a schematic view showing a display terminal according to some embodiments of the present disclosure.

Referring to FIG. 10, FIG. 10 is a schematic view showing a display terminal according to some embodiments of the present disclosure. As shown in FIG. 10, a display terminal 1000 includes: a first reception module 1001 configured to receive and store an original image from a processing terminal, the original image being an image rendered by the processing terminal; an acquisition module 1002 configured to acquire a first image from the original image; and a display module 1003 configured to display the first image between a first time point and a second time point. The acquisition module 1002 is further configured to acquire a second image from the original image, and the display module 1003 is further configured to display the second image between the second time point and a third time point.

Figure 11:
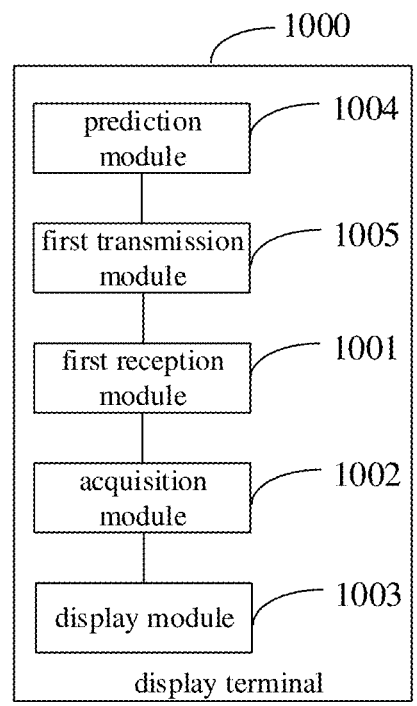
FIG. 11 is another schematic view showing the display terminal according to some embodiments of the present disclosure.

In a possible embodiment of the present disclosure, as shown in FIG. 11, the display terminal 1000 may further include: a prediction module 1004 configured to predict, at a fourth time point, first posture data about the display terminal between the first time point and the second time point; and a first transmission module 1005 configured to transmit the first posture data to the processing terminal, the first posture data being used by the processing terminal to render the original image.

In a possible embodiment of the present disclosure, the acquisition module 1002 is further configured to clip the original image in accordance with the first posture data to acquire the first image.

In a possible embodiment of the present disclosure, the prediction module 1004 is further configured to predict, at a fifth time point, second posture data about the display terminal between the first time point and the second time point, the fifth time point may be a time point after receiving and storing the original image from the processing terminal, and the acquisition module 1002 is further configured to clip the original image in accordance with the second posture data to acquire the first image.

In a possible embodiment of the present disclosure, the prediction module 1004 is further configured to predict, at a sixth time point, third posture data about the display terminal between the second time point and the third time point, the sixth time point may be a time point between the first time point and the second time point, and the acquisition module 1002 is further configured to clip the original image in accordance with the third posture data to acquire the second image.

It should be appreciated that, in the embodiments of the present disclosure, the prediction module 1004 may not be limited to necessarily predict the first posture data. For example, in some embodiments of the present disclosure, the prediction module 1004 may merely predict the third posture data.

It should be appreciated that, the implementation of the display terminal 1000 may refer to that of the image display method in the embodiments as shown in FIG. 1 with a same beneficial effect, which will thus not be particularly defined herein.

Figure 12:
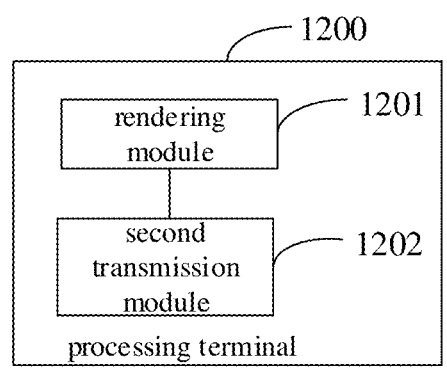
FIG. 12 is a schematic view showing a processing terminal according to some embodiments of the present disclosure.

Referring to FIG. 12, FIG. 12 is a schematic view showing a processing terminal according to some embodiments of the present disclosure. As shown in FIG. 12, a processing terminal 1200 includes: a rendering module 1201 configured to render an image to generate an original image, the original image including a first image to be displayed by a display terminal between a first time point and a second time point and a second image to be displayed between the second time point and a third time point; and a second transmission module 1202 configured to transmit the original image to the display terminal.

Figure 13:
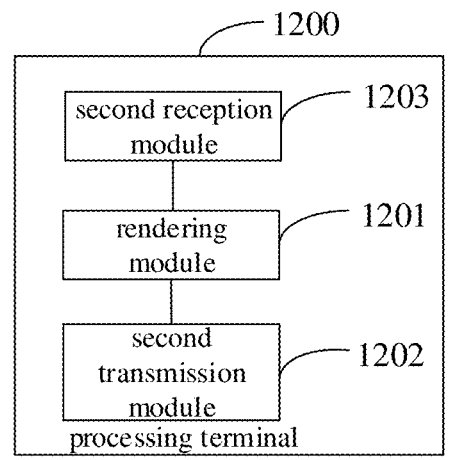
FIG. 13 is another schematic view showing the processing terminal according to some embodiments of the present disclosure.

In a possible embodiment of the present disclosure, as shown in FIG. 13, the processing terminal 1200 may further include a second reception module 1203 configured to receive first posture data from the display terminal, and the rendering module 1201 is further configured to render the image in accordance with the first posture data to generate the original image.

In a possible embodiment of the present disclosure, the rendering module 1201 is further configured to render the image in accordance with the first posture data and a predetermined scale to generate the original image, and a size of the original image may be greater than an image displayed by the display terminal by the predetermined scale.

It should be appreciated that, the implementation of the processing terminal 1200 may refer to that of the image processing method in the embodiments as shown in FIG. 9 with a same beneficial effect, which will thus not be particularly defined herein.

Figure 14:
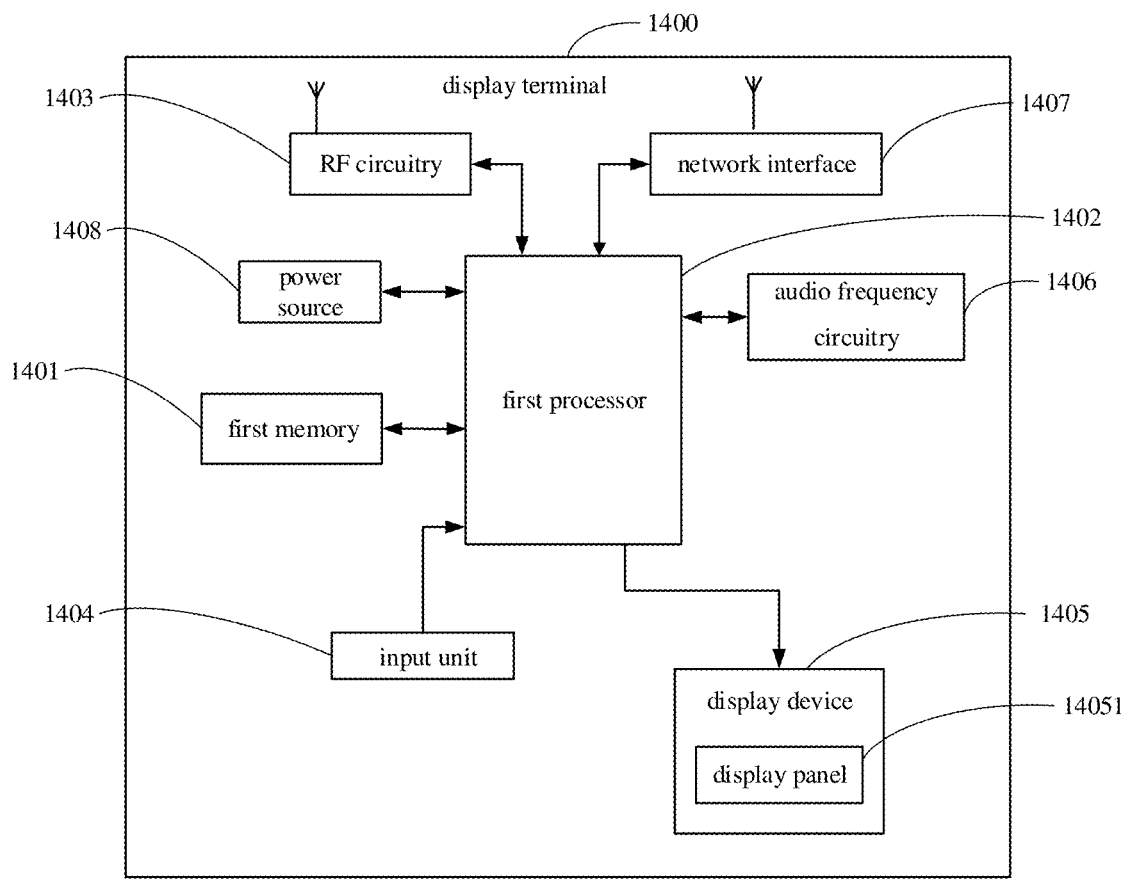
FIG. 14 is yet another schematic view showing the display terminal according to some embodiments of the present disclosure.

Referring to FIG. 14, FIG. 14 is another schematic view showing the display terminal according to some embodiments of the present disclosure. As shown in FIG. 14, a display terminal 1400 includes a first memory 1401, a first processor 1402, a Radio Frequency (RF) circuitry 1403, an input unit 1404, a display device 1405, an audio frequency circuitry 1406, a network interface 1407, and a power source 1408.

The input unit 1404 is configured to receive digital or character information inputted by a user, and generate a signal input related to user settings and function control of the display terminal 1400.

The display device 1405 is configured to display information inputted by the user or provided to the user. The display unit 1405 may include a display panel 14051, e.g., a Liquid Crystal Display (LCD) panel, or an Organic Light-Emitting Diode (OLED) panel.

The first processor 1402 is a control center of the display terminal 1400, and connected to each member of the entire display terminal via various interfaces and lines. The first processor 1402 is configured to run or execute software programs and/or modules stored in the first memory 1401, so as to achieve various functions of the display terminal 1400 and process the data, thereby to monitor the display terminal 1400. In a possible embodiment of the present disclosure, the first processor 1402 may include one or more processing units.

In a possible embodiment of the present disclosure, the first processor 1402 is configured to read a computer program in the first memory 1401 to receive an original image from a processing terminal, and store the original image in the first memory 1401. The original image may be an image rendered by the processing terminal. The first processor 1402 is further configured to acquire a first image from the original image, and the display device is configured to display the first image between a first time point and a second time point. The first processor 1402 is further configured to acquire a second image from the original image, and the display device is further configured to display the second image between the second time point and a third time point.

In a possible embodiment of the present disclosure, prior to receiving the original image from the processing terminal, the first processor 1402 is further configured to: predict, at a fourth time point, first posture data about the display terminal between the first time point and the second time point; and transmit the first posture data to the processing terminal, the first posture data being used by the processing terminal to render the original image.

In a possible embodiment of the present disclosure, when acquiring the first image from the original image, the first processor 1402 is further configured to clip the original image in accordance with the first posture data to acquire the first image.

In a possible embodiment of the present disclosure, when acquiring the first image from the original image, the first processor 1402 is further configured to: predict, at a fifth time point, second posture data about the display terminal between the first time point and the second time point, the fifth time point being a time point after receiving and storing the original image from the processing terminal; and clip the original image in accordance with the second posture data to acquire the first image.

In a possible embodiment of the present disclosure, when acquiring the second image from the original image, the first processor 1402 is further configured to: predict, at a sixth time point, third posture data about the display terminal between the second time point and the third time point, the sixth time point being a time point between the first time point and the second time point; and clip the original image in accordance with the third posture data to acquire the second image.

It should be appreciated that, the implementation of the display terminal 1400 may refer to that of the image display method in the embodiments as shown in FIG. 1 with a same beneficial effect, which will thus not be particularly defined herein.

Figure 15:
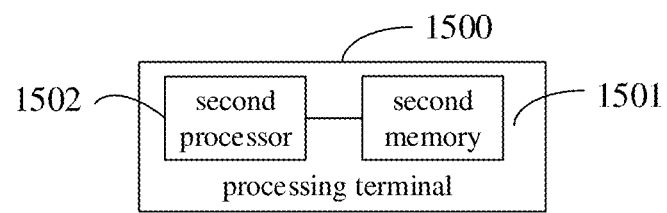
FIG. 15 is yet another schematic view showing the processing terminal according to some embodiments of the present disclosure.

Referring to FIG. 15, FIG. 15 is another schematic view showing the processing terminal according to some embodiments of the present disclosure. As shown in FIG. 15, a processing terminal 1500 includes a second memory 1501, a second processor 1502, and a computer program stored in the second memory 1501 and executed by the second processor 1502.

The second processor 1502 is configured to read the computer program in the second memory 1501 to: render an image to generate an original image, the original image including a first image to be displayed by a display terminal between a first time point and a second time point and a second image to be displayed between the second time point and a third time point; and transmit the original image to the display terminal.

In a possible embodiment of the present disclosure, prior to rendering the image to generate the original image, the second processor 1502 is further configured to receive first posture data from the display terminal. When rendering the image to generate the original image, the second processor 1502 is further configured to render the image in accordance with the first posture data to generate the original image.

In a possible embodiment of the present disclosure, when rendering the image in accordance with the first posture data to generate the original image, the second processor 1502 is further configured to render the image in accordance with the first posture data and a predetermined scale to generate the original image, and a size of the original image may be greater than a size of the image displayed by the display terminal by the predetermined scale.

It should be appreciated that, the implementation of the processing terminal 1500 may refer to that of the image processing method in the embodiments as shown in FIG. 9 with a same beneficial effect, which will thus not be particularly defined herein.

It should be appreciated that, in some embodiments of the present disclosure, the processor may be a Field Programmable Gate Array (FPGA), a Central Processing Unit (CPU), an Integrated Circuit (IC) or a Microcontroller Unit (MCU), which will not be particularly defined herein.

The present disclosure provides in some embodiments a computer-readable storage medium storing therein a computer program. The computer program is executed by a first processor to implement the above-mentioned image display method, or the computer program is executed by a second processor to implement the above-mentioned image processing method.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. An image display method for a Head-Mounted Display (HMD), comprising:
receiving and storing an original image from a processing terminal, the original image being an image rendered by the processing terminal; wherein a frame rate desired for the HMD is a first frame rate, the processing terminal provides each image to the HMD at a second frame rate, and the second frame rate is smaller than the first frame rate;
acquiring a first image from the original image;
displaying the first image between a first time point and a second time point;
acquiring a second image from the original image; and
displaying the second image between the second time point and a third time point;
wherein the original image comprises the first image and the second image both acquired through clipping the original image, and a part of the first image and a part of the second image are clipped from a same part of original image;
wherein prior to receiving and storing the original image from the processing terminal, the image display method further comprises: predicting, at a fourth time point, first posture data about the HMD between the first time point and the second time point; and transmitting the first posture data to the processing terminal, the first posture data being used by the processing terminal to render the original image;
wherein the acquiring the first image from the original image comprises clipping the original image in accordance with the first posture data to acquire the first image;
wherein the acquiring the second image from the original image comprises: predicting, at a sixth time point, third posture data about the HMD between the second time point and the third time point, the sixth time point being a time point between the first time point and the second time point; and clipping the original image in accordance with the third posture data to acquire the second image.

2. The image display method according to claim 1, wherein prior to receiving and storing the original image from the processing terminal, the image display method further comprises: predicting, at a fourth time point, first posture data about the HMD between the first time point and the second time point and eyeball position data between the first time point and the second time point; and transmitting the first posture data and the eyeball position data to the processing terminal, the eyeball position data being used by the processing terminal to optimize a part of the original image corresponding to the eyeball position data.

3. The image display method according to claim 1, wherein the acquiring the first image from the original image comprises: predicting, at a fifth time point, second posture data about the HMD between the first time point and the second time point, the fifth time point being a time point after receiving and storing the original image from the processing terminal; and clipping the original image in accordance with the second posture data to acquire the first image.

4. The image display method according to claim 1, wherein the original image comprises an Augmented Reality (AR) or Virtual Reality (VR) image.

5. A Head-Mounted Display (HMD), comprising a display device, a first memory and a first processor, the first processor is configured to receive an original image from a processing terminal and store the original image in the first memory, the original image is an image rendered by the processing terminal, the first processor is further configured to acquire a first image from the original image, the display device is configured to display the first image between a first time point and a second time point, the first processor is further configured to acquire a second image from the original image, and the display device is further configured to display the second image between the second time point and a third time point;
wherein a frame rate desired for the HMD is a first frame rate, the processing terminal provides each image to the HMD at a second frame rate, and the second frame rate is smaller than the first frame rate;
wherein the original image comprises the first image and the second image both acquired by through the original image, and a part of the first image and a part of the second image are clipped from a same part of original image;
wherein prior to receiving the original image from the processing terminal, the first processor is further configured to: predict, at a fourth time point, first posture data about the HMD between the first time point and the second time point; and transmit the first posture data to the processing terminal, the first posture data being used by the processing terminal to render the original image;

wherein when acquiring the first image from the original image, the first processor is further configured to clip the original image in accordance with the first posture data to acquire the first image;

wherein when acquiring the second image from the original image, the first processor is further configured to: predict, at a sixth time point, third posture data about the HMD between the second time point and the third time point, the sixth time point being a time point between the first time point and the second time point; and clip the original image in accordance with the third posture data to acquire the second image.

6. The HMD according to claim 5, wherein prior to receiving the original image from the processing terminal, the first processor is further configured to: predict, at a fourth time point, first posture data about the HMD between the first time point and the second time point and eyeball position data between the first time point and the second time point; and transmit the first posture data and the eyeball position data to the processing terminal, the eyeball position data being used by the processing terminal to optimize a part of the original image corresponding to the eyeball position data.

7. The HMD according to claim 5, wherein when acquiring the first image from the original image, the first processor is further configured to: predict, at a fifth time point, second posture data about the HMD between the first time point and the second time point, the fifth time point being a time point after receiving and storing the original image from the processing terminal; and clip the original image in accordance with the second posture data to acquire the first image.

8. The HMD according to claim 5, wherein the original image comprises an AR or VR image.

9. A non-transitory computer-readable storage medium storing therein a computer program, wherein the computer program is executed by a first processor to implement an image display method for a Head-Mounted Display (HMD), comprising:

receiving and storing an original image from a processing terminal, the original image being an image rendered by the processing terminal; wherein a frame rate desired for the HMD is a first frame rate, the processing terminal provides each image to the HMD at a second frame rate, and the second frame rate is smaller than the first frame rate;

acquiring a first image from the original image;

displaying the first image between a first time point and a second time point;

acquiring a second image from the original image; and displaying the second image between the second time point and a third time point;

wherein the original image comprises the first image and the second image both acquired through clipping the original image, and a part of the first image and a part of the second image are clipped from a same part of original image;

wherein prior to receiving and storing the original image from the processing terminal, the image display method further comprises: predicting, at a fourth time point, first posture data about the HMD between the first time point and the second time point; and transmitting the first posture data to the processing terminal, the first posture data being used by the processing terminal to render the original image;

wherein the acquiring the first image from the original image comprises clipping the original image in accordance with the first posture data to acquire the first image;

wherein the acquiring the second image from the original image comprises: predicting, at a sixth time point, third posture data about the HMD between the second time point and the third time point, the sixth time point being a time point between the first time point and the second time point; and clipping the original image in accordance with the third posture data to acquire the second image.

10. The non-transitory computer-readable storage medium according to claim 9, wherein prior to receiving and storing the original image from the processing terminal, the image display method further comprises: predicting, at a fourth time point, first posture data about the HMD between the first time point and the second time point and eyeball position data between the first time point and the second time point; and transmitting the first posture data and the eyeball position data to the processing terminal, the eyeball position data being used by the processing terminal to optimize a part of the original image corresponding to the eyeball position data.

11. The non-transitory computer-readable storage medium according to claim 9, wherein the acquiring the first image from the original image comprises: predicting, at a fifth time point, second posture data about the HMD between the first time point and the second time point, the fifth time point being a time point after receiving and storing the original image from the processing terminal; and clipping the original image in accordance with the second posture data to acquire the first image.

12. The non-transitory computer-readable storage medium according to claim 9, wherein the original image comprises an Augmented Reality (AR) or Virtual Reality (VR) image.

* * * * *